Aug. 23, 1966  G. MECKLER  3,268,720
LIGHTING SYSTEM

Filed Aug. 2, 1965  9 Sheets-Sheet 1

INVENTOR.
GERSHON MECKLER
BY
ATT'YS.

INVENTOR.
GERSHON MECKLER
BY
ATT'YS

INVENTOR.
GERSHON MECKLER
BY
ATT'YS

INVENTOR.
GERSHON MECKLER

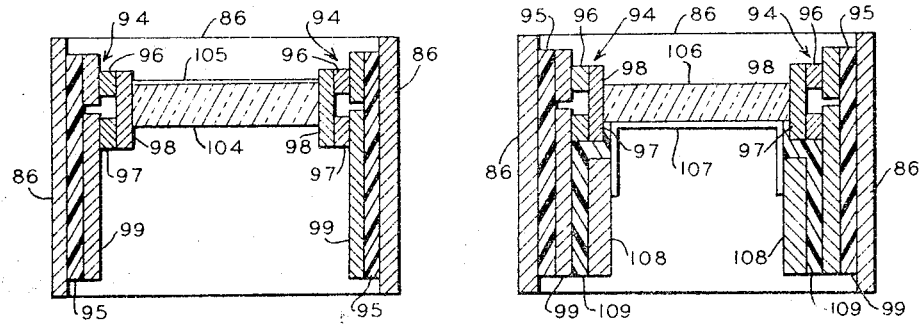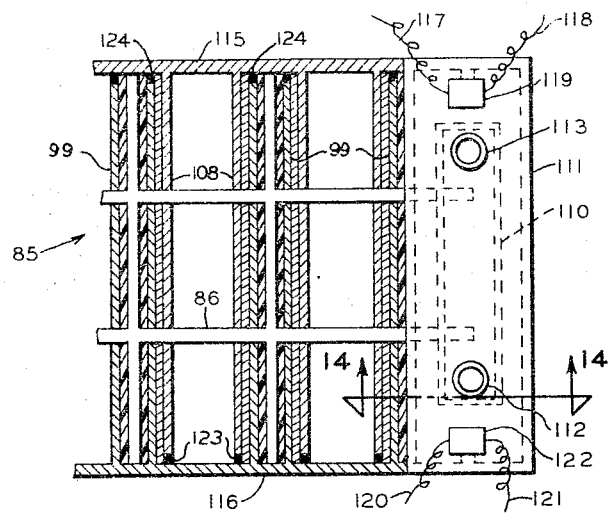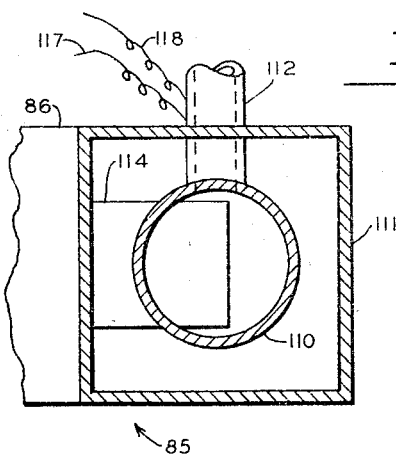

Aug. 23, 1966 G. MECKLER 3,268,720
LIGHTING SYSTEM
Filed Aug. 2, 1965 9 Sheets-Sheet 6

INVENTOR.
GERSHON MECKLER
BY
ATT'YS.

Aug. 23, 1966  G. MECKLER  3,268,720
LIGHTING SYSTEM
Filed Aug. 2, 1965  9 Sheets-Sheet 7

INVENTOR:
GERSHON MECKLER
BY
ATT'YS.

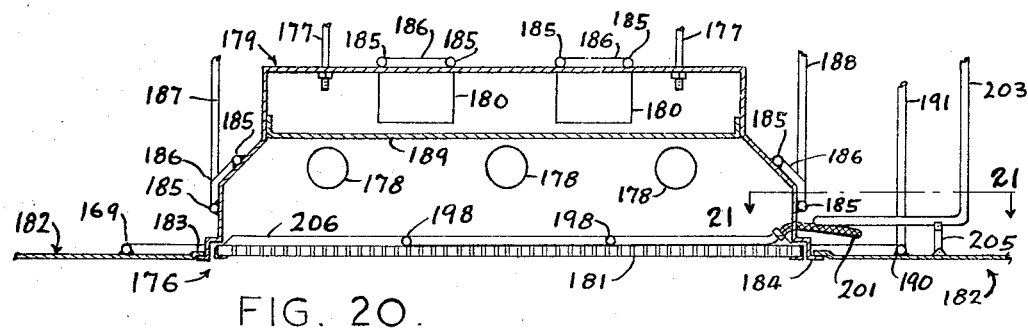
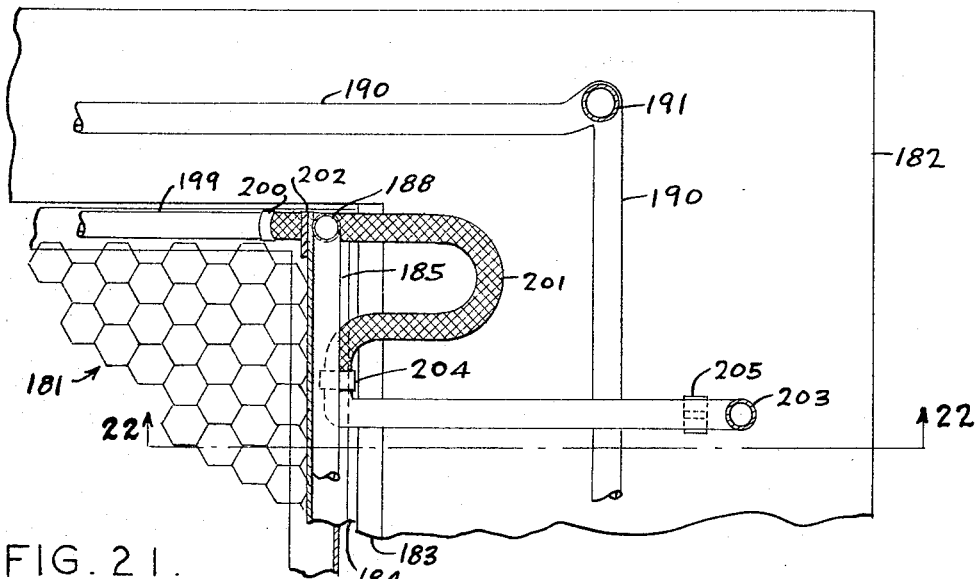
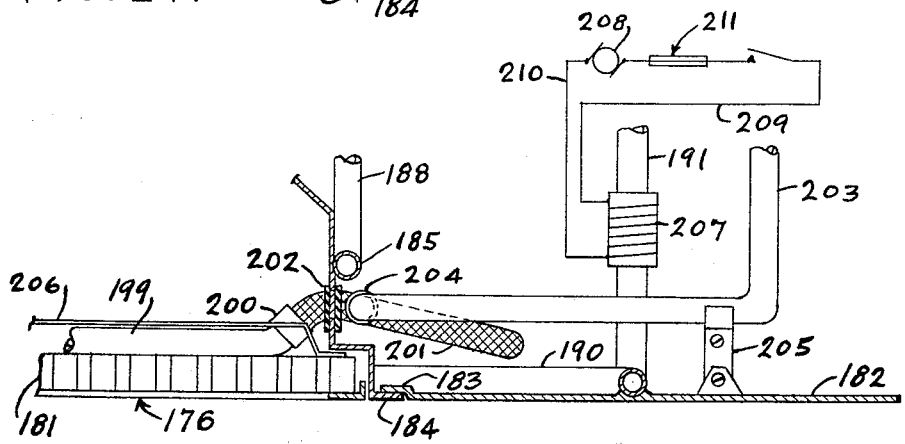

Aug. 23, 1966  G. MECKLER  3,268,720
LIGHTING SYSTEM
Filed Aug. 2, 1965  9 Sheets-Sheet 9

INVENTOR:
GERSHON MECKLER
BY
ATT'YS.

3,268,720
LIGHTING SYSTEM
Gershon Meckler, Atlanta, Ga., assignor to Lithonia
Lighting, Inc., Conyers, Ga., a corporation of Georgia
Filed Aug. 2, 1965, Ser. No. 476,236
26 Claims. (Cl. 240—47)

This is a continuation-in-part of application Serial No. 31,902 filed May 26, 1960, now abandoned, and is also a continuation-in-part of application Serial No. 140,416 filed September 21, 1961.

The present invention relates to the lighting of the interior of buildings and the like and more particularly to the dissipation of undesirable heat which is introduced into buildings as an incident to natural and artificial lighting thereof.

A considerable amount of heat as radiant energy is present in natural light, both in the visible range and in the infrared and the ultraviolet ranges. The presence of this heat in natural light causes numerous problems in the heating and air conditioning of buildings. More particularly, when clear glass is used in building fenestrations much of the heat is transmitted into the interior of the building. In an attempt to solve this problem, heat absorbing glass has been substituted for the clear glass and combinations of heat absorbing glass and clear glass have likewise been utilized. While a certain amount of heat is absorbed by the heat absorbing glass, still a substantial amount is transmitted into the interior of the building. The transmitted heat constitutes a severe problem for presently known air conditioning systems, because it affects only a part of a building at any given time, thus causing a condition of imbalance within a building so that certain portions thereof require more heating or cooling than do others. The problem is further complicated because the affected portions of the building change as the relative position of the sun changes. Also, the absorption of some of the energy tends to increase the temperature of glass and may in some cases elevate the temperature of the glass to such an extent that the glass acts as a hot body from which heat energy is transferred into the interior of the building even after radiant energy ceases to strike it.

Artificial light sources such as fluorescent lamps and incandescent bulbs generate sufficient heat that they also constitute a problem for presently known air conditioning systems. While the heat may be desirable in some cases and at certain times, it is undesirable when the building is to be cooled, presently known air conditioning systems rely, at least to a substantial extent, upon the circulation of refrigerated air to remove such energy from the building. As a consequence, with such former system, an increase in lighting intensity necessitates an increase in rate of circulation of refrigerated air. It has been found that increasing the lighting intensity within a building to 200 foot candles or higher necessitates with such systems, even those which use radiant cooling, an impractically high rate of circulation of refrigerated air.

The present invention is based upon the discovery of apparatus for preventing or minimizing the thermal load normally imposed upon the air conditioning system of a building as an incident to lighting thereof by artificial sources, natural sources, or both. In one aspect, the invention is based upon the discovery that thermoelectric cooling units comprising suitably electrically connected thermojunctions in contact with one or more surfaces of a multisheet sandwich structure can be used to dissipate the heat obsorbed by the glass. Likewise such a circuit comprising thermojunctions properly positioned with respect to an artificial light source can be used to dissipate the undesirable heat generated by this source.

It is, therefore, an object of the present invention to provide apparatus for preventing or minimizing the thermal load normally imposed on a building air conditioning system as an incident to lighting thereof from natural sources, artificial sources, or both.

It is another object of the invention to provide a sandwich structure comprising a thermoelectric circuit for the dissipation of heat.

A further object of the invention is to provide means for cooling an artificial light source.

Other objects and advantages of the invention will be apparent from the following detailed description, reference being had to the accompanying drawings, in which:

FIGS. 5 through 12 are enlarged sectional views in elevation showing various embodiments of a louvered panel grid of the present invention which is another of the components of the apparatus of FIG. 1;

FIG. 13 is an enlarged plan view of a portion of a louvered panel grid of the invention;

FIG. 14 is a sectional view taken along lines 14—14 of FIG. 13;

FIG. 15 is a sectional view in elevation of a different embodiment of the mounting means for the artificial light source;

FIG. 16 is a vertical sectional view of still another embodiment of the mounting means for the artificial light source;

FIG. 20 is a cross-sectional view of the lighting fixture taken along the line 20—20 in FIG. 17;

FIG. 21 is a plan view of a portion of the lighting fixture taken along the line 21—21 in FIG. 20 and shown on an enlarged scale;

FIG. 22 is a cross-sectional view of a portion of the lighting fixture taken along the line 22—22 of FIG. 21;

Figure 1:
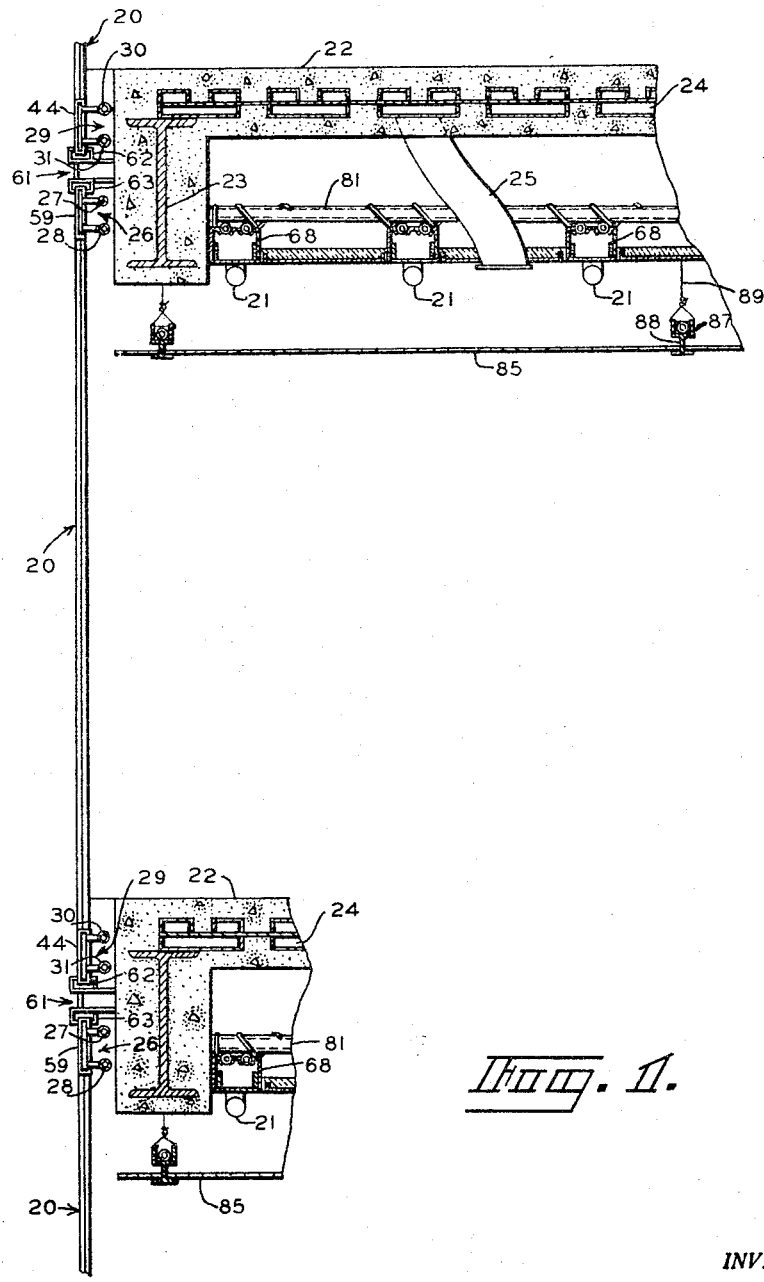
FIG. 1 is a sectional view in elevation of a building, and shows the relative positions within the building of various components of apparatus according to the present invention.

Referring now to the drawings and more particularly to FIG. 1, there is shown a typical lighting system embodying the features of the present invention which is installed in an enclosed structure such as a building. More particularly this lighting system includes a transparent thermoelectric panel indicated generally at 20 through which natural light is transmitted to the interior of the structure. The panel absorbs, from the transmitted light, heat in the visible range of the spectrum, in the ultraviolet range, and in the infrared range. The lighting system also includes a plurality of supplemental sources 21 of artificial light, which sources can be, for example, fluorescent units within the structure for selectively augmenting the transmitted natural light.

Referring first to FIGURE 1, the building comprises a plurality of concrete fills on cellular decks 22 that are supported by beams 23. Passages 24 are formed in the decks 22 to conduct a fluid medium, such as air, for heating, cooling or other air conditioning of the structure. This fluid may be conveyed to or from the various rooms within the structure through suitable flexible conduits, one of which is designated 25 and each of which is in communication with one of the passages 24.

The building also has a heat transfer system which includes a first stage 26 located near the ceiling of each level of the building and comprises a supply pipe 27 as well as a return pipe 28 for conveying a heat exchange fluid such as water around the periphery of the building. The system also includes a second stage 29 located at the floor of each level of the structure as shown most clearly in FIG. 1. The second stage 29 is substantially identical with the first stage in that it comprises a supply pipe 30 as well as a return pipe 31 for conveying a heat transfer fluid. The temperature of the water in the first stage is preferably in the range of 65 to 75° F., while the somewhat hotter second stage has a temperature within the range of 85 to 95° F.

According to the present invention cooling means are associated with both the thermoelectric panel 20 and the artificial light source 21 for removing heat that is absorbed, or would otherwise be transmitted, by the thermoelectric panel 20 and the heat that is generated by the artificial light source 21. Heat exchange means connected to the building heat transfer system, including both the first stage 26 and the second stage 29, for removing heat from the cooling means are provided.

Figure 2:
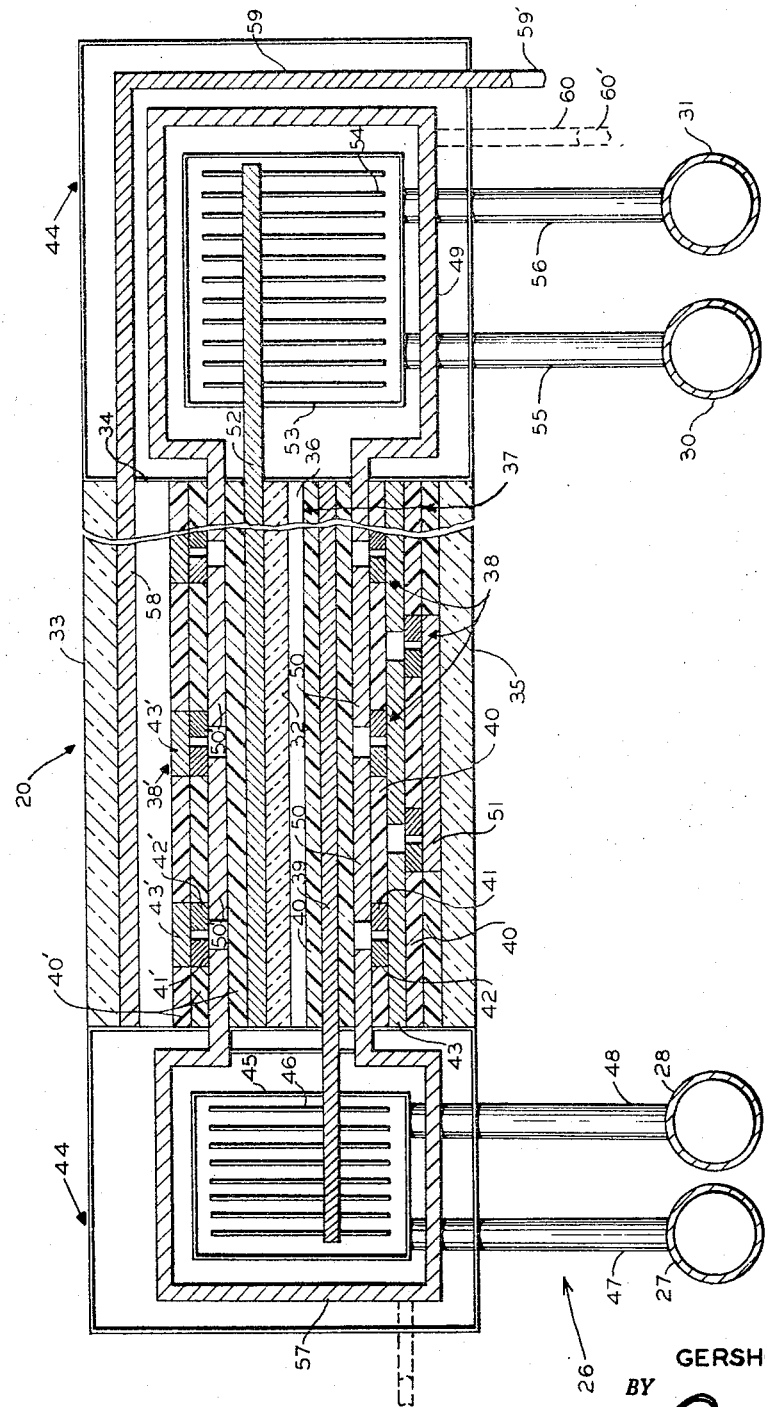
FIG. 2 is an enlarged sectional view of a thermoelectric panel of the present invention which is one of the components of the apparatus of FIG. 1.

Referring to FIG. 2, the thermoelectric panel 20 comprises a plate 32 of heat absorbing glass located substantially at the center of the panel 20. A transparent sheet 33 is separated from the heat absorbing plate 32 by an air space 34 and the transparent sheet 33, which may be of clear glass or the like, is on the outermost side of the panel 20 which faces outwardly from the building. A second transparent sheet 35, which is similar to the sheet 33, located on the innermost side of the panel 20 and faces the interior of the building. The sheet 35 is separated from the heat absorbing plate 32 by a suitable air space 36.

Cooling means in the form of a refrigerator assembly 37 is carried by the inside sheet 35 in the part of the air space 36 which is adjacent the sheet 35, and between the heat absorbing plate 32 and the transparent sheet 35. The refrigerator assembly 37 serves to cool the transparent sheet 35, and, to a certain extent, the air space 36, and comprises a laminate including a plurality of thermojunctions 38 and a refrigerator sink 39. The components of the refrigeration assembly are both supported and separated from one another by means of transparent insulating layers 40, which maintain these components in thermal contact but out of electrical contact.

Each of the thermojunctions 38 comprises a p-type semiconductor element 41 connected to an n-type semiconductor element 42 by means of a plate 43 which is both heat conducting and electrically conducting. A p-type element 41 of $Bi_2Te_3$ or of PbTe is satisfactory. The n-type semiconductor element can be of $Bi_2Te_3$ or of PbTe. Such elements having "figure of merit" of about $2 \times 10^{-3}$ are presently available commercially. The instant invention is not specifically concerned, however, with the identity of the p- and n-type elements.

The refrigerator sink 39 comprises a plurality of extremely thin, narrow strips of a heat conducting material such as copper. The strips are parallel to one another and are laminated between two insulating layers 40. The strips of the refrigerator sink 39 preferably extend vertically and are spaced approximately 20 to the foot.

The insulating layers 40 should have not only good dielectric strength but also clear optical properties, and may be films of vinyl polymers, polyester-polyethylene laminates, or equivalents thereof.

In order to remove heat from the refrigerator sink 39, heat exchange means within the building structure is associated therewith. More particularly, the panel 20 includes a frame 44 and a chamber 45 into which conductors of the refrigerator sink 39 extend. The chamber 45 is located within that portion of the frame 44 which extends along the top of the panel 20 and preferably contains water or other heat transferring fluid. Heat exchange between the refrigerator sink 39 and the fluid within the chamber 45 is aided by fins 46 located in the fluid in thermal contact with the refrigerator sink 39. The chamber 45 is conected to the supply pipe 27 of the first stage 26 of the building heat transfer system by means of a fluid conduit 47. The opposite end of the chamber 45 is further connected to the return pipe 28 of the first stage 26 of the building heat transfer system by means of a similar conduit 48, and the heat transferring fluid in constantly circulated through the chamber 45

A direct current is passed through the thermojunctions 38, which pump heat to the sink 39 for dissipation by the circulation of the fluid through the chamber 45. More particularly, direct current is supplied to a plurality of series and parallel conductors 49 within the frame 44 in a manner which will later be described in greater detail. Such current passes through a circuit which includes the p-type elements 41, the plates 43, the n-type elements 42, and conductors 50. The p- and n-type elements are maintained out of electrical contact with the refrigerator sink 39 by one of the insulating layers 40. The current flow is in a direction to cause cold junctions on each of the thermojunctions 38 toward the sheet 35 and hot junctions toward the plate 32. As a consequence, the plates 43 become cold, heat being pumped therefrom to the conductors 50, and from there being transferred to the heat sink 39 and dissipated in the chamber 45.

These cold plates 43 are maintained in thermal contact with the inside transparent sheet 35 through a metal vapor film 51 that is deposited upon the innermost surface of the sheet 35. As shown in FIG. 2, the film 51 connects adjacent thermojunctions 38 at the cold junctions thereof and forms a thermal cascade with the plates 43 through a plurality of parallel series circuits.

A metallic film 52 which is similar to the film 51 is provided, for example by vapor deposition, upon the outwardly facing surface of the heat absorbing plate 32, and this film extends into a suitable chamber 53 located in the bottom of the panel 20. The chamber 53 contains water or other heat transferring fluid for heat exchange with the film 52. Such heat exchange is aided by fins 54 which are in contact with the film 52 and with the fluid within the chamber 50. This fluid is supplied to the chamber 53 and circulated therethrough by means of a supply conduit 55 that is connected to the supply pipe 30 and a return conduit 56 connected to the return pipe 31.

Electric current is supplied to the thermojunctions 38 on the cold side of the panel by means of a plurality of thermojunctions 38′ located in the space between the out-side sheet 33 and the heat absorbing plate 32. The thermojunctions 38' comprise a p-type element 41' and an n-type element 42' which are connected by a plate 43'. The thermojunctions 38' are laminated to and are in thermal contact with the film 52, but are electrically insulated therefrom by a plurality of transparent layers 40' which are similar to the insulating layers 40. Likewise the thermojunctions 38' are connected in series by a conductor 50'. The thermojunctions 38' on the outer side of the panel 20 are so arranged as to generate a direct current when the plates 43' are heated by an exterior source such as the source of natural light.

An energized heat pump is formed by electrically connecting the conductors 49 to both the thermojunctions 38' and the thermojunctions 38 in the bottom of the frame 44 while completing a direct current circuit by connecting the heat generating thermojunctions 38' to the heat pumping thermojunctions 38 by a plurality of conductors 57 located in the top of the frame 44 adjacent the chamber 45 but insulated therefrom. More particularly, the conductors 49 and 57 connect the thermojunctions 38 and 38' in series and carry the direct current generated by the thermojunctions 38'. The surfaces of the plates 43' are preferably blackened to increase the heat absorbing characteristics thereof. When these plates become heated a direct current is generated which passes through the conductors 49 and 57 to and from the thermojunctions 38. Thus, the heat absorbing plate 32, the film 52, and the thermojunctions 38' form a current generator assembly.

In such a device, the temperature of the air space 34 may reach 200° F. while the interior of the glass sheet 35 is maintained at 75° F. Heat transfer from the hotter air space 34 to the air space 36 is reduced by the heat absorbing glass plate 32, and heat absorbed thereby is transferred to the film 52, which operates as a generator sink. This heat is then dissipated by means of the fins 54 within the chamber 53.

An electric heater 58 which comprises a series of spaced electrically conducting elements is carried by the outermost sheet 33 and is connected to the alternating current power supply source of the building by means of leads 59 and 59' located in the frame 44. The heater 58 is used to supplement the source of natural light for heating the receiver plates 43' when the heat from the source of natural light is insufficient to operate the generator assembly. An electroluminescent film as well as a photoconductive film can be used instead of the heater 58 to serve the dual function of supplemental heating of the receiver plates 43' and of amplifying and filtering the natural light.

If desired, a supplemental source of direct current may by connected to the conductors 49 and 57 by means of suitable leads 60 and 60', in parallel with the generator formed by the plate 32, film 52, and thermojunctions 38'. A D.C. voltage is then applied across the leads 60 and 60' to supplement current flowing from the generator. This embodiment is particularly useful in installations wherein the excessive use of A.C. heater 58 might cause undesirable stresses in the sheet 33.

As shown in FIG. 1, the transparent panel 20 is secured to the building by means of suitable brackets 61 each of which comprises a lower support section 62 which carries the panel 20 along the bottom portion of the frame 44. Each bracket 61 includes a top support section 63 which engages the top portion of the frame 44.

In order to illustrate the effectiveness of the thermoelectric panel of the present invention, the structure was compared with several types of conventional light transparent panels. More particularly, a pair of spaced plates of heat absorbing glass was found to transmit 95 B.t.u.'s per square foot per hour under design conditions, while a pair of spaced glass sheets in which only the sheet towards the source of natural light was heat absorbing glass was likewise found to transmit 95 B.t.u.'s per square foot per hour under such conditions. In a third example, a plate of clear glass was found to transmit 183 B.t.u.'s per square foot per hour, while, in a fourth example, a single sheet of heat absorbing glass was found to transmit 126 B.t.u.'s per square foot per hour. In contrast, the thermoelectric panel of the present invention was found to transmit only 20 to 30 B.t.u.'s per square foot per hour, under such conditions. Consequently, a considerable reduction in the heat transfer through the light transmitting panel was clearly shown.

Figure 3:
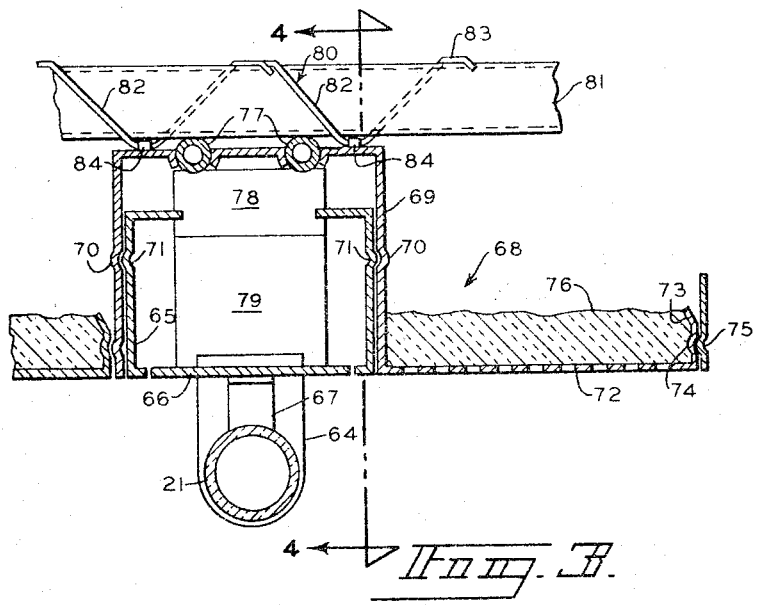
FIG. 3 is an enlarged sectional view in elevation showing means for mounting artificial light sources within the building of FIG. 1.
Figure 4:
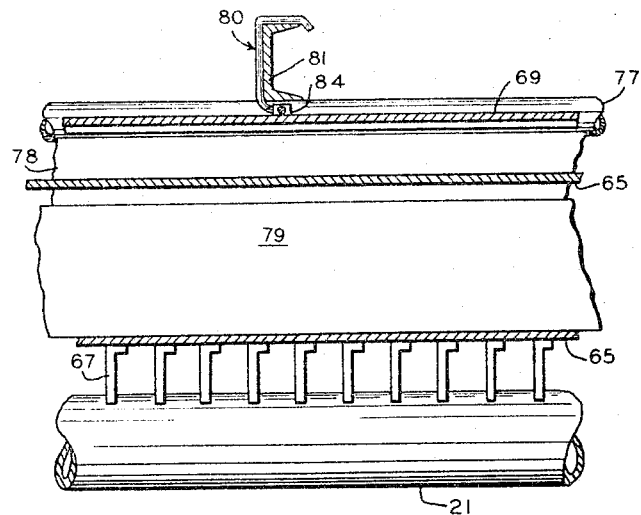
FIG. 4 is a view in section taken along line 4—4 of FIG. 3.

Referring again to FIG. 1, light transmitted into the building through the panel 20 can be augmented by means of a plurality of spaced artificial light sources 21. As shown in FIGS. 3 and 4, each of these sources comprises a fluorescent tube or the like which is supported by means of a socket 64 that is carried by an elongated mounting member 65 that encloses the conventional electrical raceway and ballast of a lighting unit. A removable plate 66 is carried along the bottom of the member 65 to provide access to the interior of the mounting member 65 for servicing the various elements contained therein. As shown in FIG. 4 a plurality of spaced cooling fins 67 are mounted in the plate 66, and the fins 67 contact the source to aid in dissipating heat generated in the source 21. The fins 67 not only cool the walls of the source 21 by conducting heat to a fluid heat transfer medium in a manner which will be described later, but also cool the electrodes of the unit.

An important feature of the invention is the provision of an integrated radiant panel 68 which not only cools the space around the light source 21 but also mounts the unit in spaced relationship with other units as shown in FIG. 1. The spacing between the sources 21 is determined by the modular dimensions of the panels 68 which is a function of the lighting intensity required within the plurality of adjacent spaces within the structure which are separated by partitions (not shown).

The panel 68 includes a contoured portion 69 which has substantially the same configuration as the elongated member 65 and is contiguous therewith. The contoured portion 69 is provided with suitable recesses 70 for receiving matching protrusions 71 on the member 65 thereby forming a selectively removable connection that enables easy removal of the member 65 from the panel 68. Inasmuch as the panel 68 is in physical contact with the contoured portion 69, heat which has been transferred by the fins 67 to the plate 66 is transferred to the panel 68 by conduction.

The panel 68 also includes a second portion 72 which is rigidly secured to or structurally integral with the first portion 69 and which is provided with a plurality of apertures for noise level reduction. As shown most clearly in FIG. 3, the apertured portion 72 spans the space between the contoured portion 69 of a given panel 68 and the contoured portion 69 of an adjacent panel 68. Thus the width of the apertured portion 72 may be changed to alter the modular dimension of the panel 68 to vary the foot-candle light intensity within the adjacent partitioned spaces.

The end of the apertured portion 72 which is oppositely disposed from the contoured portion 69 is turned upwardly to form a tab 73 which has a suitable recess 74 formed therein for receiving a matching protrusion 75 on the contoured portion 69. The extreme outermost end of the tab 73 is bent toward the contoured portion 69 to make certain that the apertured portion 72 of one panel 68 will clear the edge of the contoured portion 69 of an adjacent panel 68.

If desired, suitable acoustical insulation 76 may be supported on the relatively flat apertured portion 72 between the contoured portions 69 of panels 68. Likewise relatively large openings may be formed in the apertured portion 72 for the installation of suitable supply or return air diffusers on the flexible ducts 25 as shown in FIG. 1.

The apertured portion 72 likewise removes heat from the adjacent area in the vicinity of the artificial light source 21 and this heat is conducted to the contoured portion 69. In order to remove the heat from the contoured portion 69, a plurality of fluid carrying pipes 77 are installed above the panels 68 prior to the installation of the panels 68, and good heat transfer is insured by mounting the contoured portion 69 in physical contact with the pipes 77 as shown in FIG. 3. The pipes 77 are connected to the building heat transfer system and fluid is circulated therethrough. Heat transfer is further aided by a heat conducting plate 78 that is mounted on a ballast portion 79 of the lighting unit.

The panel 68 is secured to the building by means of a pair of hangers 80 which engage a carrying channel 81 that extends between adjacent beams 23 of the building. As shown in FIG. 3, each of the hangers 80 is substantially V-shaped having a pair of legs 82, each of which passes on opposite sides of the channel 81. A hook 83 is formed on the end of each leg 82 and extends over the channel 81 to the opposite side to lock the hanger 80 in place. Any suitable connection 84 may be utilized between the hanger 80 and the panel 68.

A further important feature of the invention shown in FIG. 1 is the provision of a louvered panel grid 85 mounted below the light sources 21. The grid 85 comprises a plurality of thermal conductors 86 which absorb heat generated by the sources 21 and control the temperatures of the various areas within the structure. As shown in the various embodiments of the invention disclosed in FIGS. 5 through 14, the thermal conductors 86 are arranged in a grid-like formation having a relatively large space therebetween to provide a plurality of heat absorbing surfaces.

The thermal conductors 86 are cooled by circulating a fluid through suitable heat exchange chambers 87 such as water pipes that are supported in the building and in thermal contact with the thermal conductors 86. Support for the chambers 87 is provided by hangers 88 made of a heat conducting material. The hangers 88 are suspended by cables 89 as shown in FIG. 1. By circulating either hot or cold water through the pipes 87, the space temperature and the heat transfer relationship within different partitioned spaces are selectively controlled.

Figure 5:
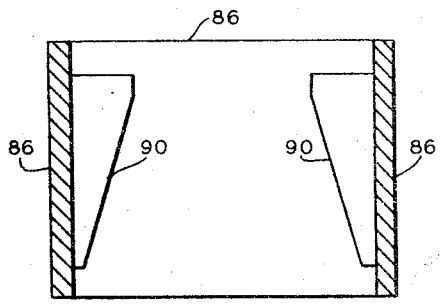

While the space between adjacent thermal conductors 86 may be open, the amount of heat absorbed by these thermal conductors is increased considerably by the use of fins 90 shown in FIG. 5. These fins 90 not only increase the surface exposed to the space below the light source 21 thereby increasing the amount of heat which may be absorbed, but they also aid in controlling the light distribution in various portions of the structure. More particularly the fins may be constructed of a material in which the index of refraction changes as the temperature changes.

Figure 6:
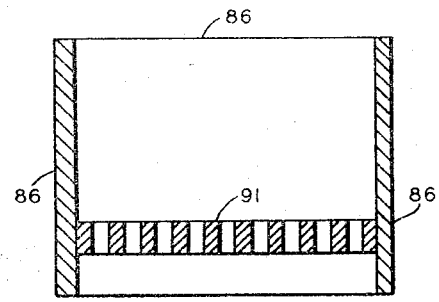

In the embodiment shown in FIG. 6 an apertured heat conducting baffle plate 91 spans the space between adjacent thermal conductors 86 and is in thermal contact therewith. The baffle plate 91 has exceptionally good thermal conduction and exhibits excellent acoustical properties, as well as acting as a light diffuser.

Figure 7:
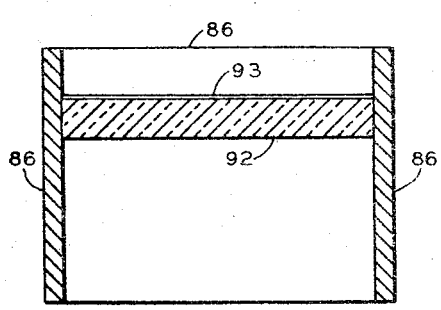

In the embodiment shown in FIG. 7, a light transmitting plate 92 is mounted between the thermal conductors 86, and an interference film 93 which is in contact with the thermal conductors 86 is carried by the plate 92. The interference film 93 is used to control the color of the light transmitted by the plate 92.

In the embodiments shown in FIGS. 8 through 12, the cooling effect of the thermal conductors 86 is increased by the addition of thermojunctions 94 that are mounted on the thermal conductors 86 in thermal contact therewith but maintained out of electrical contact therewith by an insulating layer 95. Each of the thermojunctions 94 comprises a p-type semi-conductor element 96 and an n-type semi-conductor element 97 and a plate 98 which connects the elements 96 and 97 both thermally and electrically. All of the thermojunctions 94 are electrically connected by a conductor 99 to provide a series circuit, and a direct current is passed through this circuit in the proper direction to make the plates 98 cold sources. The opposed hot sources are in thermal contact with the thermal conductors 86 through the electrical insulating layers 95.

Figure 8:
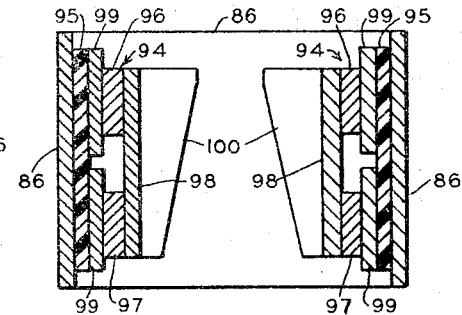
Figure 9:
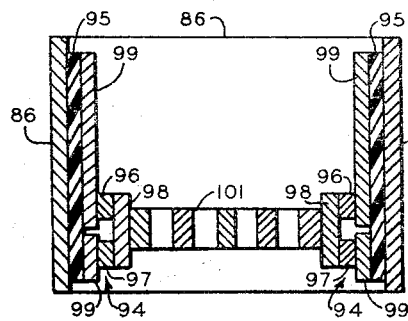

In the embodiment shown in FIG. 8 the heat transfer rate to the cold plate 98 is increased by heat conductive fins 100 which are in thermal contact with the plates 98. The fins 100 may be similar in construction to the fins 90 in that they may be of a material in which the index of refraction changes with a change in temperature.

A heat conductive baffle plate 101 has a plurality of apertures therein and is in thermal contact with the plates 98 of oppositely disposed thermojunctions 94 on the thermal conductors 86. The baffle plate 101 may be similar to the baffle plate 91.

Figure 10:
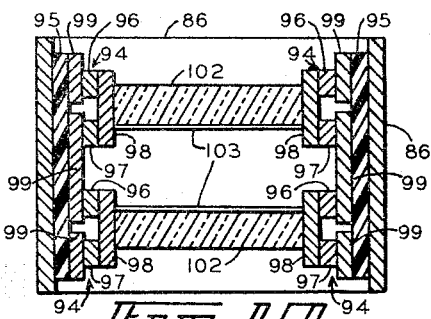
Figure 115:
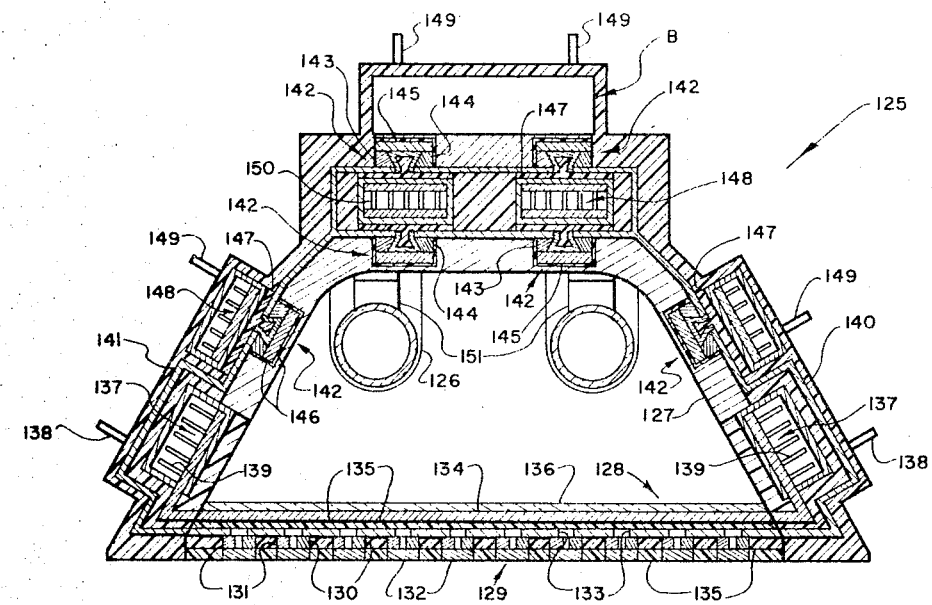
Figure 116:
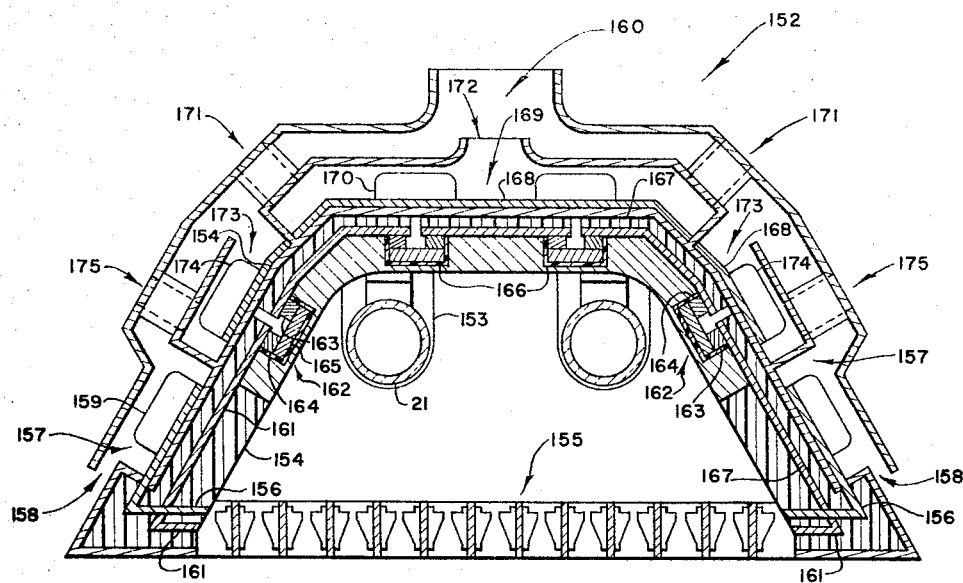

In the embodiment shown in FIG. 10, sheets 102 of transparent material such as glass are positioned between the plates 98 of oppositely disposed thermojunctions 94 on the thermal conductors 86. The lighting characteristics of this luminous ceiling may be selectively varied by the use of a polarizing film 103 on each of the sheets 102. The material of the films 103 may be such that the degree of polarization or of interference is determined by the temperature of this material. The lighting characteristics of the luminous ceiling may be altered further by the embodiment of the invention shown in FIG. 11 wherein a transparent sheet 104 is mounted between the plates 98, and an interference film 105 is carried by this sheet. The film 105 may be similar to the film 93.

Still another feature of the present invention is shown in FIG. 12 wherein a transparent sheet 106 carries an electro-luminescent film 107 for light amplification. More particularly, when an alternating current is passed through the film 107 it becomes a supplemental source of artificial light. An alternating current is supplied to the film 107 by means of a conductor 108 that is in electrical contact with the film 107 but is maintained out of electrical contact with the thermojunction 94 by means of a suitable insulator 109. In an alternate embodiment a photo-conductive phosphor may be deposited on the upper surface of the sheet 106 and energized from a separate source of alternating current.

Referring to FIGS. 13 and 14, there is shown an alternate cooling means for circulating a cooling fluid for removing the absorbed heat from the thermal-conductors 86 and supplying both direct current to the conductors 99 and alternating current to the conductors 108. More particularly, instead of using a water pipe 87 that is separate from the grid of thermal-conductors 86, a fluid conduit 110 is carried within a container 111 that is secured to the ends of the thermal-conductors 86.

The heat exchange fluid is circulated through the conduit 110, entering through a supply conduit 112 that is connected to the supply pipe 27 of the first stage 26 of the building heat exchange system. A return conduit 113 is likewise connected to the return pipe 28. Heat exchange between the thermal-conductors 86 and the heat exchange fluid is aided by fins 114 that are connected to the ends of the thermal-conductors 86 and extend into the fluid conduit 111.

As shown in FIG. 13 a pair of stacked alternating current bus bars 115 are mounted along one side of the louvered panel grid 85 while a direct current bus bar 116 is mounted along the opposite side thereof. Alternating current is supplied to the uppermost bus bar 115 by a suitable supply lead 117 that is connected to an alternating current power source in the building structure. The alternating current circuit is completed back to the alternating current supply through a return lead 118, and as shown in FIG. 13 the alternating current leads are mounted upon the container 111 by means of a suitable junction box 119.

Direct current is supplied to the uppermost direct current bus bar 116 by means of a direct current supply lead 120 and the circuit is completed from the lower direct current bus bar 116 to the building direct current supply through a return lead 121. Both of the direct current leads are mounted upon the container 111 by means of a junction box 122.

Each of the conductors 108 which carries alternating current are insulated from the direct current bus bars by means of insulators 123 while similar insulators 124 separate the conductors 99 which carry direct current from the alternating current bus bars 115.

Two alternate devices for mounting the source 21 of artificial light are shown in FIGS. 15 and 16. More particularly, the mounting device shown in FIG. 15 comprises a luminaire 125 which includes a socket 126 for mounting the sources 21 of artificial light such as fluorescent tubes. The luminaire 125 also includes a reflector 127 mounted above the sources 21 which carries a standard ballast B mounted in the uppermost portion thereof. The light from the sources 21 is diffused by means of a panel 128 which may be mounted on the endmost portions of the reflector 127 or spaced therefrom. The panel 128 is a light transmitting laminated structure. If desired, a grid shown in FIG. 16 and subsequently discussed in detail, may be substituted for the panel 128.

Instead of utilizing a panel 68 as shown in FIGS. 1 and 3 for mounting the luminaire 125, any suitable device may be used to support this structure inasmuch as the luminaire 125 carries its own cooling means in the form of a heat pump which comprises a plurality of thermojunctions 129 which are a part of the panel.

Each of the thermojunctions 129 comprises a p-type semi-conductor element 130 connected to an n-type semi-conductor element 131 by means of a plate 132 which is both heat conducting and electrically conducting. The thermojunctions 129 are electrically connected by a plurality of conductors 133 to form a plurality of series circuits. A direct current is passed through each of the conductors 133 and the thermojunctions 129 in such a fashion as to establish cold junctions on the side towards the plates 132 while simultaneously establishing hot junctions on the side toward the conductors 133.

In order to dissipate the heat from the hot junctions on the thermocouples 129, a thermal conductor 134 is carried by the panel 128 in thermal contact with each of the thermojunctions 129 but is maintained out of electrical contact therewith by means of an insulating layer 135. The thermal conductors 134 are deposited on a glass sheet 136 which carries the entire assembly, including the insulating layer 135, the conductor 133, and the thermojunctions 129. The thermal conductors 134 extend into suitable fluid conduits 137 mounted on the luminaire 125. The conduits 137 have inlet passages 138 at one end and outlet passages (not shown) at the opposite end. Water is circulated through the conduits 137 by connecting the inlet passages 138 to the supply pipe 27 while connecting the outlet passages to the return pipe 28. Heat exchange between the thermal conductor 134 and the water is aided by fins 139 mounted on the thermal conductors 134 and having surfaces in contact with the water.

Direct current is supplied to the thermojunctions 129 of the heat pump through electrical conductors 140 and 141, both of which are extensions of the conductor 133, and which connect a plurality of thermojunctions 142 in a plurality of series circuits. Each thermojunction 142 comprises a p-type semi-conductor element 143 connected to an n-type semi-conductor element 144 by means of a plate 145. Each of the plates 145 is electrically insulated from the reflector 127 by a vinyl polymer sheet 146, or the like. Each of the plates 145 is mounted towards a heat source such as the source 21 or a ballast member B and is heated thereby. When the plates 145 become heated, a direct current is generated which passes through the electrical conductors 140 and 141 to the thermojunctions 129. In an alternate embodiment the conductors 140 and 141 may also be connected to batteries (not shown) which are, in turn, connected to a D.C.-A.C. converter that supplies alternating current to the source 21 for operation at high frequencies with increased efficiency. Heat is transferred from the thermojunctions 142 through an electrically insulating, thermally conducting film 147 to a chamber 148 through which water is flowed from an inlet 149 to an outlet (not shown). Fins 150 are provided to facilitate heat transfer in each of the chambers 148 while fins 151 aid in cooling the sources 21. Fins 151 are utilized not only to cool the walls of the source 21, but also to cool the electrodes; thus maintaining optimum lamp efficiency.

The generator-heat pump circuit of the luminaire of FIG. 15 can be provided with separate leads, in parallel with the generator portion of the circuit, so that a D.C. voltage can be supplied thereto for the purpose of supplementing that which is generated. The cooling effect of the heat pump portion of the circuit is then augmented. Similarily, the entire circuit can be broken at any desired point and independently energized by a D.C. voltage to cause a current to flow therethrough and to cause hot junctions and cold junctions as discussed above. In such circuit, the thermojunctions 142, as well as the thermojunctions 129, act as heat pumps. As a consequence, the level of the energy conducted to the fins 150 is raised, by comparison with the circuit actually shown, where the thermojunctions 142 act as generators.

Referring now to FIG. 16 there is shown a luminaire 152 having a socket 153 for supporting the source 21 of artificial light. The luminaire 152 also comprises a reflector 154 mounted above the source 21 and a grid 155 mounted below the source 21.

Cooling means in the form of a heat pump is mounted upon the grid 155 and this heat pump comprises a plurality of thermojunctions mounted below the light source 21 in a manner similar to embodiment shown in FIG. 8 to absorb heat generated by these sources. Each of the thermojunctions comprises a p-type semi-conductor element connected to an n-type semi-conductor element by means of a plate which is both heat conducting and electrically conducting. A direct current is passed through the thermojunctions in such a manner as to create cold junctions as described in connection with FIG. 8.

In order to cool the grid 155, thermal conductors 156 extend outwardly therebeyond into suitable chambers 157 adjacent the luminaire 152. A suitable fluid heat transfer medium such as air enters various inlet openings indicated at 158 in the chamber 157. The heat transfer medium passes over fins 159 which are mounted in thermal contact with the thermal conductors 156 to aid in the heat transfer from the grid 155. By proper spacing of the openings 158, an even flow of air is maintained through the chamber 157 to an outlet 160 formed in the uppermost region of the luminaire 152 adjacent a ballast member (not shown).

A direct current is supplied to the thermojunctions on the grid 155 through a conductor 161 which is located outwardly of the reflector 154 and insulated therefrom. A direct current is supplied to the conductor 161 by a generator assembly which comprises a plurality of thermojunctions 162 connected in series by the conductor 161. Each of the thermojunctions 162 comprises a p-type semi-conductor element 163 connected to an n-type semi-conductor element 164 by means of a plate 165 which is both electrically conducting and heat conducting. Each plate 165 is insulated from the reflector 154 by a strip 166 of electrical insulation and the conductor 161 is electrically insulated from the reflector 154 by a thermally conducting strip 167.

As shown in FIG. 16, the plates 165 face the sources 21 and absorb heat therefrom to generate a direct current in the thermojunctions 162. Heat is transferred from the thermojunctions 162 to thermal conductors 168 which are likewise mounted within a chamber 169. Heat transfer from these thermal conductors 168 to the air within the chamber 169 is aided by means of fins 170 which are in thermal contact with the thermal conductors 168 and provide a large heat transfer surface in contact with the air. Air is introduced into the chamber 169 through inlet openings 171 and the air leaves through an outlet 172 immediately beneath the outlet 160.

The thermal conductor 168 also extends into auxiliary chambers 173 which have fins 174 therein to aid in the dissipation of heat therefrom. Air enters the chamber 173 through inlet openings 175 and passes into the chamber 157 to maintain equal air flow over the fins 159, 170 and 174.

An important feature of the combination apparatus according to the invention, as shown in FIG. 1, or with other embodiments of specific elements of the apparatus substituted for those specifically shown therein, is the provision of a plurality of devices, each of which can be controlled independently, for counteracting different types of problem heat associated with the lighting of a structure, and none of which relies upon circulated refrigerated air. Specifically, and referring to FIG. 1, a substantial portion of the heat load which would otherwise be imposed upon the conditioned portion of the structure by the artificial light sources 21 is collected by the panels 68 and removed from the building by the coolant, as has been described above in detail. A further significant portion of such heat load is collected by the louvered panel grid 85, conducted to the conduits associated therewith, and removed from the space by the coolant flowing in such conduits. In this way, a substantial portion of the total heat load within the conditioned portion of the structure is dissipated without the use of any conditioned, refrigerated air. The panel 20 also significantly decreases the heat load which would otherwise be imposed by natural light, as has been discussed in detail.

The instant invention also contemplates independent zone control of heat transfer from the louvered grid 85 and independent zone control of heat transfer from the panels 68. For example, the rate of flow of coolant to transfer heat from the grid 85, and, accordingly, the temperature thereof, can be controlled as a function of dry bulb temperature or radiant energy level within a portion of the space inside the structure. For this purpose, a structure can be divided generally into several zones, e.g., a perimeter zone with generally an Eastern exposure, a perimeter zone with generally a Southern exposure, a perimeter zone with generally a Western exposure, a perimeter zone with generally a Northern exposure, and an interior zone.

Whenever a thermostat or radiant energy sensing device within one of these zones indicates that more cooling is required than is provided by a relatively low rate of flow of conditioned, refrigerated air, coolant is circulated to provide additional cooling for the grid 85 above that zone to increase the portion of the load dissipated by the grid 85. Similar controls are contemplated for the coolant of the panels 68, so that these two elements of the apparatus cooperate to dissipate varying proportions of the problem heat within the space being conditioned, and independently of rate of flow of conditioned, refrigerated air. As a consequence, the rate of flow of conditioned, refrigerated air can be maintained substantially constant, and at about the rate required for adequate ventilation, a result which can be achieved readily with a duct system of comparatively small size carrying low pressure conditioned air. The panels 20 also cooperate with the other elements of the apparatus in achieving this result by minimizing the extra load that is imposed upon an air conditioning system by natural light from the sun.

The panels 20 are self-compensating because the magnitude of the current which is generated by the thermoelements 38' and, as a result, the cooling effect of the thermoelements 38 depends upon their instantaneous temperature, which is a function of the amount of incident radiant energy. As a consequence, the greatest amount of radiant energy is dissipated at times of highest incidence, and the least amount of energy is dissipated at times of lowest incidence. The panels 20 cooperate with the grid 85 and the integrated panels 68, therefore, to minimize variations in heat load which must be carried by conditioned, refrigerated air. Structures with high lighting intensities, at least up to 500 foot-candles, are practical in structures provided with combination apparatus as described herein.

Many of the advantages of the systems according to the invention, as just described, for example individual zone control and minimum requirements for circulated, conditioned air, can be accomplished with the ceiling system disclosed in FIGS. 17 to 22 which utilizes a plurality of spaced luminaires 176 suspended from deckpanels by hanger rods 177. Each luminaire 176 mounts one or more sources of artificial light in the form of lamps 178 which may be either a high output or a slim type fluorescent tube. The luminaire 176 includes a housing 179 of a heat conductive material such as metal for enclosing one or more ballasts 180 which supplies electrical power to the lamps 178.

Figure 19:
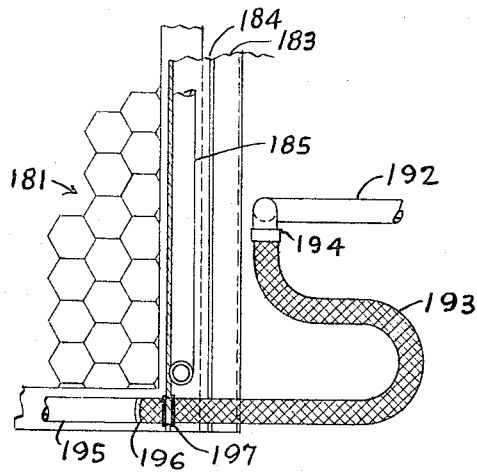
FIG. 19 is a plan view of a portion of the fixture taken along the line 19—19 in FIG. 18, and shown on an enlarged scale.

Mounted immediately below the housing 179 is a louver 181 which comprises a plurality of heat conductors arranged in a grid-like formation, as shown in FIGURES 19 and 21, to provide a maximum viewing area for heat removal. The total surface area of the louver 181 that is exposed to both the lamps 178 and the space below the luminaire 176 is greater than the surface area of a flat plate having the same projected area. By mounting the louver 181 in the opening in the bottom of the housing 179, the geometry is such that the louver 181 "sees" more of the space below the luminaire 176 than it does of the lamps 178. However, the heat removal requirements of the upper and lower surfaces of the louver 181 are balanced because the space below the luminaire 176 is at a lower temperature than the lamps 178.

A plate 182 of a heat conductive material extends outwardly from the outer peripheral surface of the lower portion of the housing 179 that is adjacent the louver 181, and each plate 182 is positioned in the space between adjacent luminaires 176 to cool both the space within the building enclosure and the louver 181. As shown in FIGURES 18 to 22, the plate 182 has offset marginal edge portions 183 which engage outwardly turned flanges 184 on the lowermost portion of the housing 179.

A plurality of spaced parallel tubes 185 are mounted in thermal contact with the housing 179, as shown in FIGURE 20, and the tubes 185 are connected to one another by connecting tubes 186 located at the opposed ends of the housing 179. Cooled water from a suitable source such as a cooling tower is supplied to the tubes 185 and 186 by a vertical conduit 187 to cool the housing 179 which, in turn, cools the lamps 178. The cooled water is returned to the building heat transfer system by another vertical conduit 188 shown in FIGURES 20 to 22. A removable plate 189 of a heat conductive material is positioned within the housing 179 between the ballasts 180 and the lamps 178, as shown in FIGURE 20, to radiantly cool these sources of heat, and the absorbed heat is conducted to the housing 179.

Figure 17:
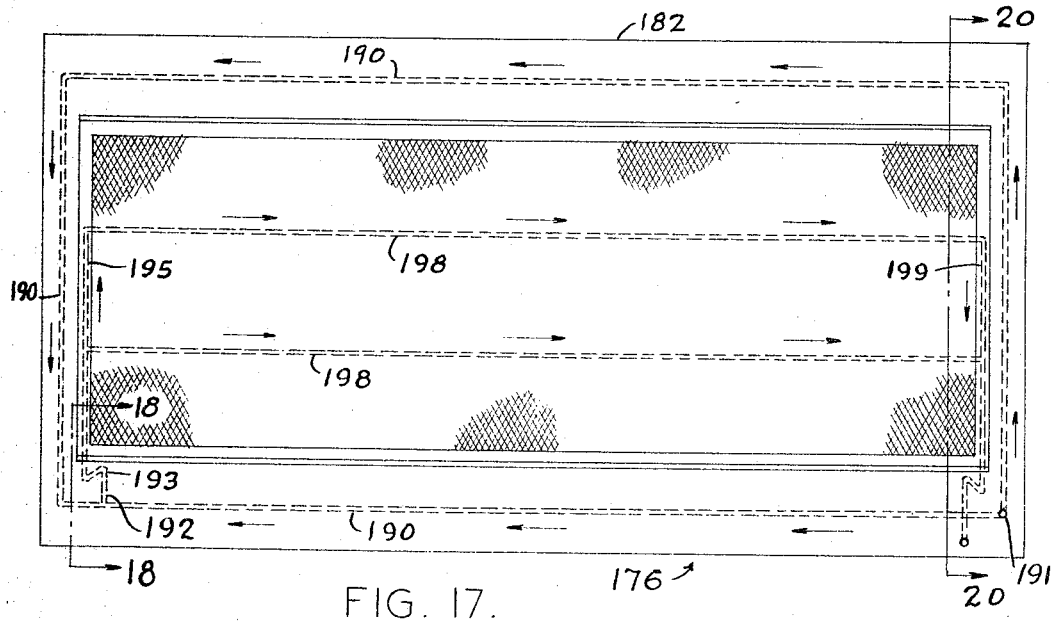
FIG. 17 is a bottom view of a lighting fixture constructed in accordance with the invention.
Figure 18:
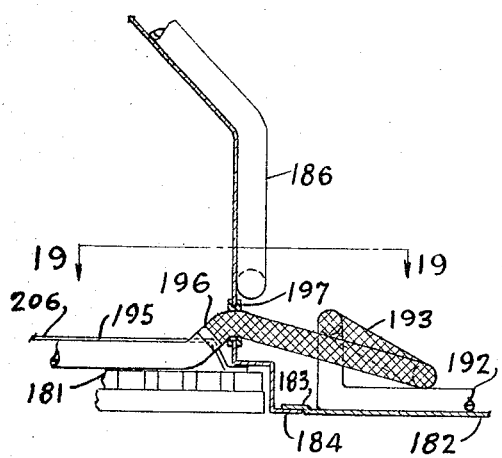
FIG. 18 is a cross-sectional view taken along the line 18—18 of FIG. 17.

A plurality of tubes 190 is mounted on the upper surface of the plate 182, as shown in FIGURES 20 and 22, and the tubes 190 completely encircle the housing 179 as shown in FIGURE 17. The tubes 190 are connected to a supply of chilled water in the building heat transfer system by a supply conduit 191, and the water flows from the conduit 191 to the tubes 190 in the direction of the arrows shown in FIGURE 17. A short connector tube 192 extends from one of the tubes 190 and is connected to a flexible tube 193 by a fitting 194. The flexible tube 193 extends through the housing 179 and is connected to a louver supply header 195 which is located within the housing 179 and extends transversely across one end thereof, as shown in FIGURE 17. The tubing 193 is of a flexible material to enable the louver 181 to be rotated downwardly for access to the lamps 178. The flexible tube 193 is connected to the louver supply header 195 by a fitting 196 and is thermally insulated from the housing 179 by a suitable bushing 197.

Chilled water from the tubes 190 flows through the louver supply header 195 in the direction of the arrow shown in FIGURE 17, and this water then flows through a plurality of spaced louver tubes 198 that are in thermal contact with the louver 181, in the direction shown by the arrows in FIGURE 17. The louver tubes 198 extend longitudinally along the upper surface of the louver 181 between the louver supply header 195 and a louver return header 199.

The chilled water removes heat from the louver 181 and moves in the direction of the arrow shown in FIGURE 17 along the louver return header 199 to a fitting 200 that connects the return header 199 to a flexible tubing 201 extending through a bushing 202 in the housing 179. The opposite end of the flexible tubing 201 is connected to a return conduit 203 by a fitting 204, and a horizontally extending leg of the return header conduit 204 is supported by a bracket 205 on the upwardly facing surface of the plate 182. Temperature staging wherein the same water is utilized to cool both the louver 181 and the lamps 178 may be provided by connecting the fitting 204 to the tubes 185. With such an arrangement, the chilled water first absorbs heat from the louver 181 and then this same water, at a higher temperature, is circulated through the tubes 185.

An important feature of the invention is the provision of a film 206 of a transparent plastic material which functions as a shield to reflect the infrared portion of the light emitted from the lamps 178 back to the interior surface of the housing 179. Thus the portion of the heat in the infrared range is removed in the most economical manner by the cooling tower water in the tubes 185 which is at a higher temperature than the chilled water in the louver tubes 192. The film 206 also reduces convection currents within the housing 179, thereby enabling the lamps 178 to be operated at an optimum temperature controlled by the cooling medium in the tubes 185.

It may be desirable to increase the temperature of the water in the tubes 190 and 198 of some of the luminaires 176 located in various zones of the building at certain times of the day. An auxiliary electric heater 207 is mounted in thermal contact with the conduit 191, as shown in FIGURE 22, and a current is supplied from a source 208 of electrical power to the lines 209 and 210 which are connected to the heater 207 in response to a signal from a thermostat 211. The thermostat 211 controls the heating of the space below the luminaires 176 without changing the flow of the water in the tubes 190 and 198.

It is usually preferable to employ constant speed pumps to circulate the water in the tubes 190 and 198 from the supply header 195, so that throttling the flow of water to some of the tubes 190 is not desirable. However, the same result that is accomplished by reheating water, using the auxiliary heater 207, can also be accomplished by bypassing all or a part of the water directly from the supply conduit 191 to the return conduit 203, in response to a signal from the thermostat 211. In this way, the cooling effect of the system of FIGS. 17–22 can be reduced at certain times of the day when the cooling load is low without the necessity for varying the rate of flow of coolant in the conduits 191 and 203, and also without introducing heat into the circulated coolant from the auxiliary heater 207.

Figure 23:
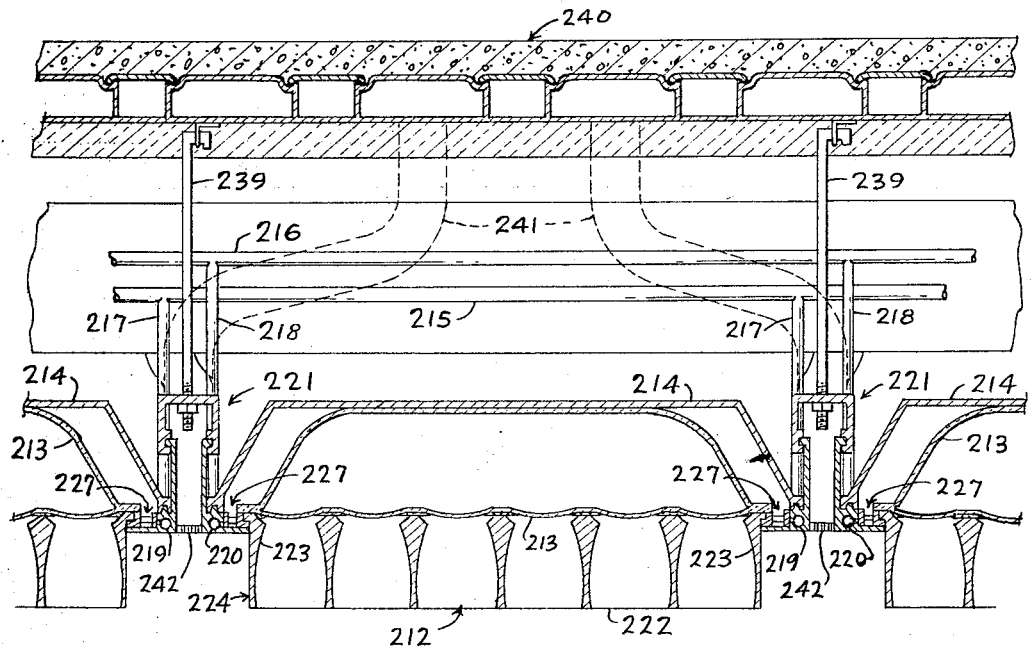
FIG. 23 is a cross-sectional view in elevation of another form of the ceiling system of this invention.
Figure 24:
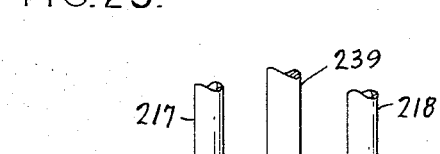
FIG. 24 is a schematic view showing the grid-like pattern of the ceiling components of FIGURE 23, as viewed from below the ceiling.

The ceiling system disclosed in FIGURES 23 to 26, inclusive, utilizes a plurality of relatively thin lighting fixtures 212 which utilize a flat-type fluorescent tube 213. In order to control the surface temperature of the tubes 213 for operation at the most efficient point for maximum light output, the fixture 145 includes a heat conductor 214 having turned down end portions. The heat conductor 214 is in thermal contact with the flat-type tube 213, as seen in FIG. 23.

Figure 25:
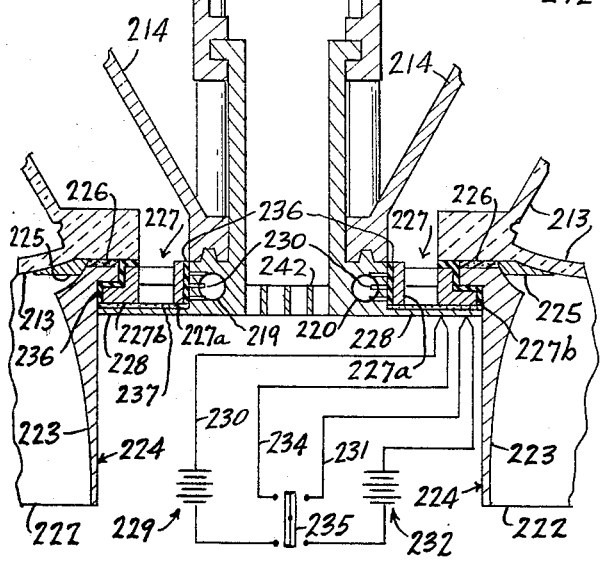
FIG. 25 is a cross-sectional view taken along line 25—25 of FIGURE 24.

The embodiment of FIGURES 23 to 26 does not utilize refrigerated water. Instead only cooling tower water from the second stage of the building heat transfer system is circulated through the headers 215 and 216, and this water preferably has a temperature of between 85° to 95° F., although in some installations the temperature may be considerably higher. The cooling tower water is circulated through pipes 217 and 218 to passages 219 and 220 in the bottom portion of a supporting structure 221 which mounts the downwardly curved ends of the heat conductor 214 as well as the ends of adjacent bars 222 and outermost grid pieces 223 of the louver 224. The bars 222 together with the grid pieces 223 are thermally insulated from the fluorescent tubes 213 by insulators 225 while marginal portions of the fluorescent tubes 213 are thermally insulated from the adjacent structure by insulators 226, as seen in FIG. 25. The ends of the heat conductors 214 are in direct thermal contact with the bottom portion of the supporting structure 221, and heat is transmitted from the conductors 214 to the cooling medium in the passages 219 and 220.

Figure 26:
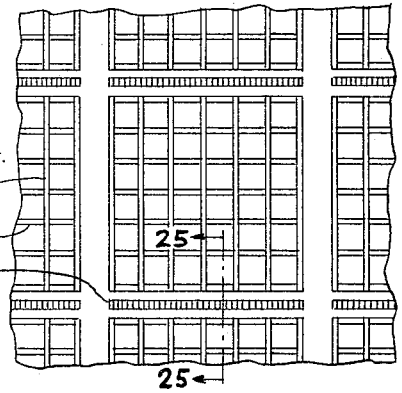
FIG. 26 is a diagrammatic view showing a portion of the electrical circuitry of the ceiling system shown in FIGURE 23.

A plurality of thermojunctions 227 are supported on outwardly directed flanges 228 between the passages 219, 220 and the adjacent bars 222. A group of thermojunctions 227 is shown in FIGURE 26, and each thermojunction comprises p-type semiconductor elements connected to n-type semiconductor elements by electrically conducting plates 227a and 227b. The p-type elements as well as n-type elements can be of $Bi_2Te_3$ or of PbTe. While these elements have a figure of merit "Z" of 2 or 3, it is contemplated that elements having values for "Z" of 5 and even 7 may be used. However, the instant invention is not specifically concerned with the identity of the p- and n-type elements.

A current is passed through the p- and n-type elements and the plates 227a and 227b from source 229 of direct current through lines 230 and 231 to form cold junctions toward the plates 227a while hot junctions are formed in the side toward the plates 227b, when it is desired to increase the temperature of the zone located below any fixture 212. In this instance, heat is transferred from the cooling tower water in the passages 219 and 220 to the louver 224 formed by the bars 222 and grid pieces 223, even though this water cools the conductor 214 and the fluorescent tube 213.

When it is desired to cool the zone below any certain fixture 212 to a degree greater than that normally obtained from the cooling tower water in the passages 219 and 220, a current is passed in the opposite direction from another source 232 of direct current through lines 233 and 234 by actuating a suitable switch 235 which forms cold junctions toward the plates 227b and hot junctions toward the plates 227a. Heat is transmitted from the bars 222 to the water in the passages 219 and 220. The thermojunctions 227 are electrically insulated from both the louver 224 formed by the bars 222 together with the grid pieces 223 and the bottom portion of the support structure 221 by insulators 236, as seen in FIG. 25. Likewise the thermojunctions 227 are electrically and thermally insulated from the flanges 228 by insulators 237. The transfer of heat from the plates 227a to the water in the passages 219 and 220 is aided by suitable fins 230 extending into the passages 219 and 220.

The supporting structure 221 is suspended by hanger rods 239 anchored in a cellular floor 240. Ducts 241 connect air passages within the cellular floor 240 to the support structure 221 which channels air flow to the space below through a vent grid 242.

The louver in the embodiments of FIGS. 17–26 serves not only to diffuse the light and remove heat from the fluorescent lamps but also to remove heat from the space below the fixture. The quantity of heat per hour which one square foot of the louver, such as that shown in FIGS. 17–22, can remove is dependent upon the difference in average temperature between the louver 181 and the water in the louver tubes 198, as well as the headers 195 and 199. Table I below lists the cooling capacity of a typical louver in B.t.u.'s per hour per square foot at various water temperature differentials.

Table I

| Louver cooling capacity, B.t.u./hr./sq. ft.: | Average temperature differential, ° F. |
|---|---|
| 5 | 0.2 |
| 10 | 0.9 |
| 15 | 1.8 |
| 20 | 2.5 |
| 25 | 3.4 |
| 30 | 4.2 |
| 35 | 5.1 |
| 40 | 5.9 |

To illustrate the economy of utilizing cooling tower water to remove heat from the luminaire housing and chilled water to remove heat from the louver, Table II below lists the power input to the building refrigeration equipment measured in watts per hour per square foot of space cooled together with the space heating load in B.t.u.'s per hour per square foot of louver that is removed by the louver at various levels of illumination measured in foot-candles. The values set forth in Table II are based on the luminaires being mounted in a room having a nine-foot ceiling, four changes of air per minute with a uniform temperature of 63° F. Each luminaire mounts either one or two fluorescent tubes which are either the slim or the high output type. The power input is listed for the various luminaires when (a) neither the housing nor the luminaire is cooled, (b) both the housing and the louver are cooled by chilled water from the refrigeration equipment, and (c) when the housing is cooled by water from the cooling tower and the louver is cooled by chilled water from the refrigeration equipment.

Table II

| Tubes per Fixt. | Tube Type | Level of Illum. | Space Load Removed | Refrigeration Input | | |
|---|---|---|---|---|---|---|
| | | | | Not Cooled | Chilled Only | Cooled and Chilled |
| One | Slim | 50 | 11.2 | 1.35 | 1.15 | 0.75 |
| One | Slim | 100 | 15.35 | 2.40 | 2.05 | 1.15 |
| One | Slim | 150 | 19.20 | 3.35 | 2.85 | 1.50 |
| Two | Slim | 50 | 8.80 | 1.35 | 1.10 | 0.65 |
| Two | Slim | 100 | 9.80 | 2.15 | 1.80 | 0.90 |
| Two | Slim | 150 | 10.80 | 2.95 | 2.45 | 1.10 |
| One | HO | 50 | 9.40 | 1.30 | 1.10 | 0.70 |
| One | HO | 100 | 11.00 | 2.00 | 1.15 | 0.95 |
| One | HO | 150 | 12.70 | 2.80 | 2.40 | 1.10 |
| Two | HO | 50 | 7.30 | 1.25 | 1.15 | 0.60 |
| Two | HO | 100 | 6.70 | 1.95 | 1.70 | 0.75 |
| Two | HO | 150 | 6.30 | 2.70 | 2.30 | 0.90 |

Table III illustrates the effect of the air conditioning and lighting systems on the total cost of building construction as the lighting level is increased from the conventional 75 footcandles to 150 footcandles using either conventional luminaires or the integrated water cooled luminaries of the present invention. Buildings ranging in total construction costs of $18, $20 and $25 per square foot of floor area at 75 footcandles are used as a basis of the comparison, and luminaires using two tubes are used in all the comparisons. The lighting and air conditioning costs are listed as percents of the total building costs.

Table III

| | | | |
|---|---|---|---|
| (A) 75 Footcandles Illumination: | | | |
| Total building cost, $/ft.² | 18 | 20 | 25 |
| Lighting cost, percent TBC | 13.4 | 12.1 | 9.7 |
| Air conditioning cost, percent TBC | 19.8 | 17.9 | 14.3 |
| (B) 150 Footcandles Illumination: | | | |
| (1) Conventional luminaires— | | | |
| Lighting cost, percent TBC | 20.7 | 18.7 | 15.0 |
| Air conditioning cost, percent TBC | 31.0 | 27.9 | 22.3 |
| Cost increases, percent TBC: | | | |
| Lighting | 7.3 | 6.6 | 5.3 |
| Air conditioning | 11.2 | 10.0 | 8.0 |
| Architectural | 0.4 | 0.4 | 0.4 |
| Total | 18.9 | 17.0 | 13.7 |
| Air conditioning operation, percent | 51 | 51 | 51 |
| (2) Integrated Water Cooled Luminaires: | | | |
| Lighting cost, percent TBC | 23.9 | 21.5 | 17.2 |
| Air conditioning cost, percent TBC | 16.1 | 14.5 | 11.6 |
| Cost increases, percent TBC—Lighting | 10.5 | 9.4 | 7.5 |
| Cost Savings, percent TBC— | | | |
| Air conditioning | 3.7 | 3.4 | 2.7 |
| Architectural | 2.0 | 2.1 | 2.3 |
| Total increase | 4.8 | 3.9 | 2.5 |
| Air conditioning operation, percent | 33 | 33 | 33 |

It will be apparent that various changes and modifications can be made from the specific details set forth in the drawings and discussed herein without departing from the spirit and scope of the invention as defined in the appended claims.

What I claim is:

1. An apparatus comprising a fixture for mounting a source of artificial light, a reflector positioned generally adjacent said fixture, a cooling panel, conduit means integral with said reflector, a plurality of thermojunctions having cold junctions in thermal contact with said cooling panel and hot junctions in thermal contact with said conduit, each of said thermojunctions comprising a p-type semi-conductor element connected to an n-type semi-conductor element by means of a plate which is both heat conducting and electrically conducting, said thermojunctions being electrically conducting to provide one series circuit, and means for connecting said thermojunctions to a source of energizing current, whereby, when an energized light is in said fixture, a heat transfer fluid is circulated through said conduit, and said thermojunctions are energized, heat from the light is transferred to the heat transfer fluid, and said cooling panel is effective to absorb heat at a temperature lower than the temperature of the heat transfer fluid.

2. An apparaus comprising a fixture for mounting a source of artificial light, a reflector positioned generally adjacent said fixture, a cooling panel, cooling means in thermal contact with said cooling panel, and normally operable to transfer heat from said cooling panel to enable said cooling panel to absorb heat from an air-conditioned space, means in thermal contact with said reflector and effective to transfer heat therefrom to a high temperature heat transfer fluid, and control means operatively associated with said cooling means and effective to control the transfer of heat thereto from said cooling panel in response to temperature changes in the air conditioned space.

3. An apparatus comprising a fixture for mounting a source of artificial light, a reflector positioned generally adjacent said fixture, a cooling panel, a thermally activated thermoelectric heat pump, said heat pump comprising thermoelectric cooling means in thermal contact with said cooling panel, and activating means including a thermoelectric generator, said activating means having a heat receiver in thermal contact with said reflector and heat transfer means for rejecting heat from said activating means by transfer to at least one heat sink, and being effective, when said heat receiver is maintained at a temperature higher than the temperature of said heat transfer means, to supply energizing current to said thermoelectric cooling means, said heat pump being effective, when such current is supplied by said generator to said cooling means, to transfer heat from said cooling panel to at least one heat sink.

4. A window structure comprising a plurality of spaced, opposed, light-transmitting panels, at least one interceptor for radiant energy transmitted through said panels, a cooling panel, a thermally activated thermoelectric heat pump, said heat pump comprising thermoelectric cooling means in thermal contact with said cooling panel, and activating means including a thermoelectric generator, said activating means having a heat receiver in thermal contact wtih said interceptor and heat transfer means for rejecting heat from said activating means by transfer to at least one heat sink, and being effective, when said heat receiver is maintained at a temperature higher than the temperature of said heat transfer means, to supply energizing current to said thermoelectric cooling means, said heat pump being effective, when such current is supplied by said generator to said cooling means, to transfer heat from said cooling panel to at least one heat sink.

5. An apparatus comprising a support for mounting a source for artificial light which is also a source for heat, light transmitting and controlling means positioned below said source in said support means and through which light from said source in said support means passes, said transmitting and controlling means having at least one heat absorbing surface, a first cooling system for said light transmitting and controlling means adapted to absorb heat from said light transmitting and controlling means at a generally predetermined low temperature level, said cooling means including a plurality of thermojunctions in thermal contact with the heat absorbing surface, each of said thermojunctions comprising a p-type semi-conductor element connected to an n-type semi-conductor element by means of a plate which is both heat conducting and electrically conducting, said thermojunctions being electrically connected to provide at least one series circuit, and a source of energizing current connected to said thermojunctions, a light reflecting structure for a light source in said support means having at least a portion positioned over said source in said support means, and a second cooling system adapted to absorb heat from said light reflecting structure at a temperature above said generally predetermined low temperature level.

6. Apparatus as claimed in claim 5, including transparent plates having transparent interference films thereon positioned between the plates of oppositely disposed thermojunctions on said thermal conductors.

7. Apparatus as claimed in claim 5, including polarizing filters positioned between the plates of oppositely disposed thermojunctions on said thermal conductors.

8. Apparatus as claimed in claim 5, including heat conductive fins in thermal contact with the plates of said thermojunctions on said thermal conductors.

9. Apparatus as claimed in claim 5, including electroluminescent phosphor members positioned between the plates of oppositely disposed thermojunctions on said thermal conductors.

10. Apparatus as claimed in claim 5, including heat conductive baffle plates having a plurality of apertures therein, said baffle plates being in thermal contact with the plates of oppositely disposed thermojunctions on said thermal conductors.

11. An apparatus comprising a fixture for mounting a source of artificial light, a reflector panel positioned on one side of said fixture, a light-transmitting panel positioned on the opposite side of said fixture, cooling means carried by said luminaire, a conduit mounted on said reflector, a plurality of fins mounted on said conduit in thermal contact with said cooling means, a plurality of thermojunctions mounted on said luminaire in thermal contact with said fins, each of said thermojunctions comprising a p-type semi-conductor element connected to an n-type semi-conductor element by means of a plate which is both heat conducting and electrically conducting, said thermojunctions being electrically conducting to provide one series circuit, a source of energizing current connected to said thermojunctions, and means for circulating fluid through said conduit in contact with said fins.

12. The apparatus as claimed in claim 11, wherein a plurality of said thermojunctions are mounted on said reflector with said plates facing toward said fixture, and a plurality of other of said thermojunctions are in heat transfer relationship with said light-transmitting panel, with said plates facing away from said fixture.

13. The apparatus as claimed in claim 11, wherein a plurality of said thermojunctions are mounted on said light-transmitting panel with said plates facing away from said fixture.

14. A light transmitting panel comprising: a first layer of glass which receives light from a light source, a center layer of heat absorbing glass, a third layer from which the light emerges, said center layer dividing said panel into a high temperature region between itself and said first layer of glass, and dividing said panels into a lower temperature region between itself and said third layer of glass, first cooling means for absorbing energy from said high temperature region at one temperature level, and second cooling means for absorbing energy from said low temperature region at a lower temperature level, said second cooling means including thermojunctions disposed in said low temperature region of said panel between said layers of glass.

15. The light transmitting panel of claim 14, wherein thermojunctions are provided in said high temperature region of said panel and which are connected in electrical series circuit with the thermojunctions in said low temperature region to supply at least some of the electrical energy required for cooling said thermojunctions in said low temperature region.

16. An apparatus comprising a fixture for mounting a source of artificial light, a reflector positioned generally adjacent said fixture, a panel for heat transfer with an associated air-conditioned space, a thermoelectric heat pump, said heat pump comprising first heat transfer means in thermal contact with said panel, second heat transfer means for transferring heat to or from said heat pump, and means for supplying, when in a first position, energizing current to said heat pump in a first direction and, when in a second position, energizing current to said heat pump in the opposite direction, said heat pump being effective, when such current is supplied in said first position, to cool said first heat transfer means to a temperature lower than the temperature of said second heat transfer means and being effective, when such current is supplied in said second position, to heat said first heat transfer means to a temperature higher than the temperature of said second heat transfer means, and means for transferring heat between said second heat transfer means and at least one heat sink.

17. A window structure comprising at least one light-transmitting panel, at least one interceptor for radiant energy transmitted through said panel, a cooling panel, a thermoelectric heat pump, said heat pump comprising cooling means in thermal contact with said cooling panel, heat transfer means in thermal contact with said interceptor for rejecting heat from said heat pump, and circuit means for supplying energizing current to said heat pump, said heat pump being effective when such current is supplied, to cool said cooling means to a temperature lower than the temperature of said heat transfer means, and means for transferring heat from said heat transfer means to at least one heat sink.

18. A window structure as claimed in claim 17 wherein said interceptor is integral with said light-transmitting panel.

19. An apparatus comprising, in combination, a fixture for mounting a source of artificial light, a cooling panel, a thermoelectric heat pump including cooling means in thermal contact with said cooling panel and heat transfer means for receiving heat from said cooling means, means for supplying energizing current to said heat pump, and means for transferring heat from said heat receiving means and from said source of artificial light to at least one heat sink.

20. A window structure comprising at least one light transmitting panel, at least one interceptor panel for radiant energy which is transmitted through said light transmitting panel, a cooling panel, a thermoelectric heat pump, said heat pump comprising cold junctions in thermal contact with said cooling panel and hot junctions in thermal contact with said interceptor panel, heat transfer means for removing heat from said hot junctions, said heat pump being effective to cool said cooling panel to a temperature lower than the temperature of said heat transfer means, and means for transferring heat from said heat transfer means to at least one heat sink.

21. The window structure as defined in claim 20 wherein said interceptor panel is integral with said light transmitting panel.

22. A system for conditioning air in an enclosed space comprising, in combination, a luminaire for mounting a source of artificial light, a window structure comprising a plurality of spaced, opposed, light transmitting panels including a substantially transparent panel facing said enclosed space and a heat absorbing panel exterior of said transparent panel, a thermoelectric heat pump, said heat pump comprising cooling means in thermal contact with said transparent panel, a heat transfer means in thermal contact with said heat absorbing panel for removing heat from said heat pump, and circuit means including hot junctions of a second thermoelectric circuit for collecting heat energy from said light source and supplying an energizing current to said heat pump, said heat pump being effective, when such current is supplied, to cool said cooling means to a temperature lower than the temperature of said heat transfer means, and means for transferring heat from said heat absorbing panel to at least one heat sink.

23. The system defined in claim 22 which includes a substantially transparent, light transmitting panel exterior of said heat absorbing panel.

24. An apparatus comprising in combination, a fixture for mounting a source of artificial light, a cooling means, a refrigerating unit having an energy input section, a cooling section and a heat rejection section, said cooling section being operatively connected with said cooling means to transfer heat from said cooling means to said cooling section, means for collecting heat energy given off by said lighting means and for utilizing such collected heat energy to perform work in said energy input section of said refrigerating unit, said refrigerating unit being effective, as a consequence of work performed in said input section, to transfer heat from said cooling section to said heat rejection section, and means for transferring heat from said heat rejection section to at least one heat sink.

25. In a system for an enclosed space, lighting means, a fixture for said lighting means, cooling means, a refrigerating unit having an energy input section, a cooling section comprising cold junctions of a thermoelectric circuit and a heat rejection section comprising hot junctions of said thermoelectric circuit, said cooling section being operatively connected with said cooling means to transfer heat from said cooling means to said cooling section, means comprising hot junctions of a second thermoelectric circuit for collecting heat energy given off by said lighting means and for utilizing such collected heat energy to perform work in said energy input section of said refrigerating unit, said refrigerating unit being effective, as a consequence of work performed in said input section, to transfer heat from said cooling section to said heat rejection section, and means for transferring heat from said heat rejection section to at least one heat sink.

26. An apparatus comprising, in combination, a fixture for mounting a source of artificial light, a cooling panel, a refrigerating unit having an energy input section, a cooling section comprising cold junctions of a thermoelectric circuit and a heat rejection section comprising hot junctions of said thermoelectric circuit, said cooling section being operatively connected with said cooling means to transfer heat from said cooling means to said cooling section, means comprising hot junctions to a second thermoelectric circuit for collecting heat energy given off by a light in said fixture and for utilizing such collected heat energy to perform work in said energy input section of said refrigerating unit, means for transferring heat energy from the cold junctions of said second thermoelectric circuit to at least one heat sink, said refrigerating unit being effective, as a consequence of work performed in said energy input section, to transfer heat from said cooling section to said heat rejection section, and means for transferring heat from said heat rejection section to at least one heat sink, whereby said luminaire, when mounted to supply light to an enclosed space, is simultaneously effective to minimize the thermal load imposed on the space by a light source.

References Cited by the Examiner

UNITED STATES PATENTS

| | | | |
|---|---|---|---|
| 2,501,418 | 3/1950 | Snowden | 20—56.5 X |
| 2,710,336 | 6/1955 | Jorn | 240—9 |
| 2,887,564 | 5/1959 | Baran. | |
| 2,887,565 | 5/1959 | Baran. | |
| 3,020,325 | 2/1962 | Winckler | 136—4 |
| 3,070,643 | 12/1962 | Toulmin | 136—4 |
| 3,188,458 | 6/1965 | Hickman | 240—9 |

NORTON ANSHER, *Primary Examiner.*

CHARLES R. RHODES, *Assistant Examiner.*